Patented June 8, 1954

2,680,747

UNITED STATES PATENT OFFICE 2,680,747

PROCESS OF PREPARING 4-METHYL-7-BIS(BETA - HYDROXYETHYL)AMINO COUMARIN

William Wilson Williams and Harlan Benjamin Freyermuth, Easton, Pa., assignors to General Aniline & Film Corporation, New York, N. Y., a corporation of Delaware No Drawing. Application May 19, 1951, Serial No. 227,282

1 Claim. (Cl. 260—343.2)

This invention relates to novel 7-hydroxyalkylamino 4 substituted coumarin compounds which have been found to be of value as fluorescent brightening or whitening agents.

These novel compounds may be prepared by condensing N-hydroxyalkyl 3-aminophenols with a β-keto ester in alcoholic solution and in the presence of zinc chloride. The novel compounds of the present invention may be represented by the following formula:

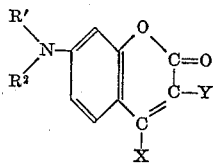

wherein R' is hydroxyalkyl group (i. e.

—$CH_2CH_2OH$, —$CH_2CHOHCH_3$ and —$CH_2COH(CH_3)_2$), $R^2$ is hydrogen alkyl or the same as R', X is hydrogen —$CH_3$, —$CF_3$, —$C_6H_5$, —COOH, —$COOCH_3$, $COOC_2H_5$, —$CH_2COOC_2H_5$ and Y is hydrogen —$CH_2C_6H_5$, alkyl, hydroxyalkyl, and finally X and Y together may form the group —$CH_2$—$CH_2$—$CH_2$—$CH_2$.

The products of the above formula have been found to be useful as fluorescent brightening agents for the whitening of cotton, viscose, cellulose acetate, etc. and have been found to be of particular value for the whitening of proteinaceous fibers such as wool and silk or nitrogenous fibers such as nylon from acid, alkaline or neutral baths.

These products may be applied to fibers either from separate treating baths or by incorporating a minor amount of the product in soap or other detergent employed for washing the material to be whitened. These novel products have also been found to be useful as fluorescent brightening agents where spirit solubility is desired, such for example in the whitening of nitrocellulose lacquers, whitening of beeswax and other natural and synthetic waxes and the whitening of natural and synthetic resins.

The details of the preparation of these novel compounds will be apparent from the following specific example in which the parts are by weight:

3-diethanolaminophenol was prepared by reacting 3-aminophenol with ethylene oxide in the manner described in U. S. Patent 1,712,716 for the preparation of 4(bis)hydroxyethylaminophenol from 4-aminophenol. The 3-diethanolaminophenol is then reacted with ethyl acetoacetate in the following manner, an excess of ethyl acetoacetate preferably being used so that about 1.1 to 1.3 molar parts of ethyl acetoacetate are present for each molar part of 3-diethanolaminophenol. A mixture of 87 parts of 3-diethanolaminophenol, 93 parts ethyl acetoacetate, 35 parts zinc chloride and 160 parts ethanol was refluxed for ten hours. The ethanol and excess ethyl acetoacetate were then removed by steam distillation and the hot aqueous solution of the product decolorized by treatment with animal charcoal and filtered. Upon cooling, the product crystallized from the solution and was purified by recrystallization from hot water. If desired, other conventional purification methods may be employed such as dissolving the product in a solution of hydrochloric acid and reprecipitating with a solution of sodium carbonate.

The thus obtained product, 7-diethanolamino-4-methylcoumarin, was applied to wool from acid, neutral and alkaline baths and found to produce a substantial whitening effect. The product was mixed with ordinary soap flakes and employed for the washing of wool and found to exert a considerable whitening effect under these conditions. It was also applied from a hot bath to cotton, acetate, rayon, nylon and silk and found to have pronounced whitening effects on these materials.

The foregoing example illustrates a general method for preparing the novel compounds of this invention, and while the 7-diethanolamino-4-methylcoumarin obtained therein is a preferred fluorescent agent of the present invention, it will be understood that other related 7-alkylolamino-4-substituted coumarins of the type included in the general formula given above also have a pronounced whitening or brightening action. Such other products may readily be prepared in the manner described in the foregoing example by employing other free alkylol aminophenols in place of the 3-diethanolaminophenol used in the foregoing example and by employing other β-keto esters in place of the ethylacetoacetate employed in the foregoing example.

A number of specific products coming within the present invention and the 3 alkylolaminophenol or the β-keto ester used to produce them in place of 3-diethanolaminophenol or ethyl acetoacetate respectively are illustrated in the following table:

Table

| 3 alkylolamino phenol used | β-keto ester used | Product |
|---|---|---|
| (HOCH₂CH₂)₂N—C₆H₄—OH<br>3-diethanolamino phenol | CH₃COCH₂COOCH₃<br>methyl-aceto-acetate | 7-diethanolamino-4-methylcoumarin |
| (HOCH₂CH₂)₂N—C₆H₄—OH<br>3-diethanolamino phenol | CH₃CO—CH(CH₂C₆H₅)—COOC₂H₅<br>ethyl α-benzyl acetoacetate | 7-diethanolamino-3-benzyl-4-methylcoumarin |
| (HOCH₂CH₂)₂N—C₆H₄—OH<br>3-diethanolamino phenol | CH₃—CO—CH(C₂H₅)—COOC₂H₅<br>ethyl α-ethyl acetoacetate | 7-diethanolamino-3-ethyl-4-methylcoumarin |
| (HOCH₂CH₂)₂N—C₆H₄—OH<br>3-diethanolamino phenol | CH₃CO—CH(C₂H₄OH)—COOC₂H₅<br>ethyl α-hydroxyethylacetoacetate | 7-diethanolamino-3-β-hydroxyethyl-4-methylcoumarin |
| (HOCH₂CH₂)₂N—C₆H₄—OH<br>3-diethanolamino phenol | C₆H₅—CO—CH₂COOC₂H₅<br>ethylbenzoylacetate | 7-diethanolamino-4-phenyl coumarin |
| (HOCH₂CH₂)₂N—C₆H₄—OH<br>3-diethanolamino phenol | (cyclohexanone-2-carboxylate)-COOC₂H₅ | (cyclohexane-fused coumarin) |
| HOCH₂CH₂—NH—C₆H₄—OH<br>3-diethanolamino phenol | CH₃COCH₂COOC₂H₅<br>ethylacetoacetate | 7-ethanolamino-4-methyl coumarin |
| HOCH₂CH₂(H₃C)N—C₆H₄—OH<br>3-(2-methyl-amino-ethanol) phenol | H₃COCH₂COOC₂H₅<br>ethylacetoacetate | 7(2-methylaminoethanol)-4-methyl-coumarin |

Table—Continued

| 3 alkylolamino phenol used | β-keto ester used | Product |
|---|---|---|
| 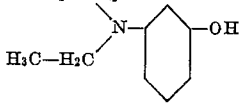<br>3-(2 ethylaminoethanol)-phenol | $H_3COCH_2COOC_2H_5$<br>ethylacetoacetate | 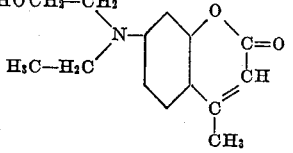<br>7(2-ethylamino-ethanol)-4-methyl coumarin |

We claim:

The method of preparing 4-methyl-7-bis(β-hydroxyethyl) aminocoumarin which comprises condensing 1 molar proportion of 3-aminophenol with 2 molar proportions of ethyleneoxide, reacting the thus obtained 3-diethanolaminophenol with ethylacetoacetate and recovering the thus produced 4-methyl-7-bis(β-hydroxyethyl) aminocoumarin.

References Cited in the file of this patent

UNITED STATES PATENTS

| Number | Name | Date |
|---|---|---|
| 2,600,375 | Ackerman | June 14, 1946 |
| 2,610,152 | Ackerman | Sept. 9, 1952 |

OTHER REFERENCES

Von Pechmann et al., Beilstein (Handbuch, 4th ed.), vol. 18, page 610 (1934).